(No Model.)

B. F. WAGGONER.
MACHINE FOR PACKING SOIL BENEATH THE SURFACE.

No. 328,263. Patented Oct. 13, 1885.

WITNESSES:
Donn Twitchell.
C. Sedgwick

INVENTOR:
B. F. Waggoner
BY Munn & Co.
ATTORNEYS.

UNITED STATES PATENT OFFICE.

BENJAMIN FRANKLIN WAGGONER, OF LITCHFIELD, ASSIGNOR TO HIMSELF AND EDWARD L. WAGGONER, OF HILLSBOROUGH, ILLINOIS.

MACHINE FOR PACKING SOIL BENEATH THE SURFACE.

SPECIFICATION forming part of Letters Patent No. 328,263, dated October 13, 1885.

Application filed June 5, 1885. Serial No. 167,794. (No model.)

*To all whom it may concern:*

Be it known that I, BENJAMIN FRANKLIN WAGGONER, of Litchfield, in the county of Montgomery and State of Illinois, have invented certain new and useful Improvements in Machines for Packing Soil Beneath its Surface, of which the following is a full, clear, and exact description.

Reference is to be had to the accompanying drawings, forming part of this specification, in which similar letters of reference indicate corresponding parts in all the figures.

Figure 1:
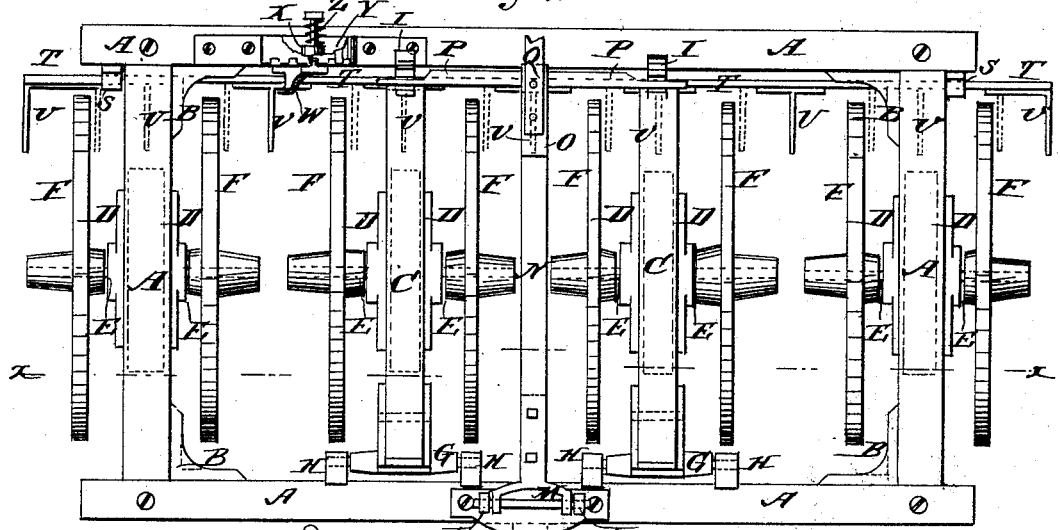
Figure 2:
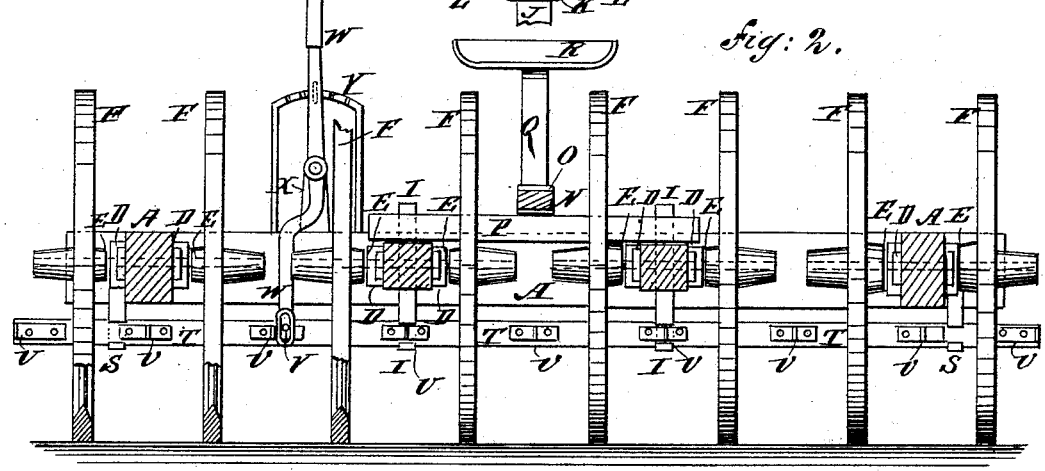
Figure 3:
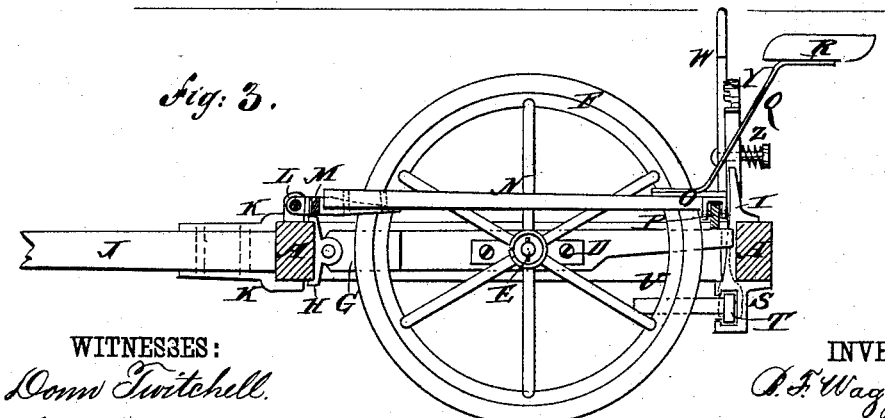

Figure 1 is a plan view of one of my improved machines parts being broken away. Fig. 2 is a sectional front elevation of the same, taken through the line $x\,x$, Fig. 1, and parts being broken away. Fig. 3 is a sectional end elevation of the same.

The object of this invention is to provide machines constructed in such a manner as to pack the soil beneath its surface, so that the said soil will retain moisture to cause sown wheat to germinate, and so that the said soil will give such a support to the roots of the grain as will prevent the said roots from being raised out of the ground and killed by the freezing and thawing of the soil.

The invention consists in the construction and combination of various parts of the machine, as will be hereinafter fully described, and then claimed.

A represents a rectangular frame of such a length and breadth as to receive eight or more wheels arranged in the manner hereinafter described. The frame A is strengthened at its angles by angle-braces B, as shown in Fig. 1.

To the opposite sides of the side bars of the frame A and to bars C, interposed between the said side bars, are attached plates D, upon which are formed journals E to receive wheels F, so that each bar will be provided with two wheels.

Two or more bars C are used, as may be desired, and the said bars are so arranged that the distances between the wheels F will be equal.

To the forward ends of the bars C are attached cross-heads G, the ends of which or journals formed upon the said ends rock in bearings H, attached to the inner side of the front bar of the frame A. In the rear ends of the bars C are formed grooves to receive and slide upon the curved bars I, attached at their middle parts to the inner side of the rear bar of the frame A, to hold the rear ends of the bars C from lateral movement while allowing them to move up and down freely.

J is the tongue, the rear end of which is secured to the forward side of the center of the front bar of the frame A by T-plates K, attached to the upper and lower sides of the said tongue and front bar, so that the said tongue J will be firmly secured to the said bar. To the upper T-plate K are attached, or upon it are formed, lugs L, to serve as bearings for the cross-head M, secured to the forward end of the bar N, so as to hinge the said bar N to the front bar of the frame A. To the upper side of the rear end of the bar N is attached a plate, O, the rear end of which projects and has downwardly-projecting jaws formed upon it to receive the central part of the cross-bar P. The cross-bar P is pivoted at its center to the jaws of the plate O, and its ends rest upon the upper sides of the rear ends of the bars C, and are kept in place by the curved guide-bars I.

To the upper side of the rear end of the bar N is also attached the lower end of the standard Q, to the upper end of which is attached the driver's seat R in such a position that its forward edge will be about over the forward edge of the rear bar of the frame A. With this construction the driver's weight will rest upon the rear ends of the hinged bars C and, consequently, upon the wheels F connected with the said bars C, while the weight of the frame A rests upon the wheels F, connected with the side bars of the said frame A. The weight of the various parts of the machine should be so arranged that each of the wheels F will bear an equal weight, so that all the said wheels will be forced into the ground with an equal pressure.

The inner or concave edges of the fellies of the wheels F are beveled into V shape, as shown in Fig. 2, to prevent soil from adhering to the said fellies and thus clogging the said wheels.

In bearings in the lower ends of the guide-bars I and of bars S, attached to the end parts of the forward side of the rear bar of the frame A, slides a bar, T, to the forward side of which are attached forwardly-projecting arms U, to serve as scrapers for removing adhering soil from the sides of the rims of the wheels F. The number of the scrapers U is one greater than the number of the wheels F, and the said scrapers are so arranged that when the bar T is moved to the left a scraper, U, will rest against the right-hand side of the rim of each of the wheels F, and when the bar T is moved to the right a scraper, U, will rest against the left-hand side of the rim of each of the said wheels, so that the adhering soil can be removed from both sides of the said rims by adjusting the bar T. To the bar T is attached a pin, V, which passes through a slot in the lower end of the lever W. The middle part of the lever W is pivoted to a standard, X, attached to the rear bar of the frame A, and its upper end projects into such a position that it can be readily reached and operated by the driver from his seat. The upper part of the lever W moves along the arched middle part of the catch-bar Y, the ends of which are attached to the rear bar of the frame A, and which is notched to engage with the lever W and hold it in any position into which it may be adjusted. The lever W is held against the catch-bar Y by a spiral spring, Z, placed upon the pivot of the said lever and interposed between the head of the said pivot and the standard X, as shown in Figs. 1 and 3.

If desired, two scrapers, U, for each wheel F can be attached to the sliding bar T, as indicated in dotted lines in Fig. 1, so that a less movement of the lever W and bar T will be required in bringing the scrapers into contact with the opposite sides of the rims of the said wheels.

With this construction, when the machine is drawn over the field the rims of the wheels F sink into the soil and pack the said soil beneath the surface of the ground, so that the said soil will retain moisture to cause the wheat to germinate, and will afford such a support to the roots of the plants as will prevent the plants from being raised out of the ground and killed by the freezing and thawing of the soil.

The machine can be drawn several times over each part of the field in such a way that the wheels will track each time in a different place until the soil has been sufficiently packed.

Boxes can be attached to the bars C and the side bars of the frame A, as indicated in dotted lines in Fig. 1, to receive sand-bags or other suitable heavy material to weight the machine to any desired extent.

With this construction the wheels F will adjust themselves to the uneven surface of the soil without affecting the equal downward pressure of the said wheels.

Having thus described my invention, what I claim as new, and desire to secure by Letters Patent, is—

1. The combination, with the front bar of the frame A, the hinged bars C, the guide-bars I, and the seat-standard and seat Q R, of the bar N, hinged to the said front bar and carrying the said seat-standard and seat, and the cross-bar P, pivoted to the rear end of the said hinged bar N and resting upon the rear ends of the said hinged bars C, substantially as herein shown and described, whereby the driver's weight is made to bear equally upon the said hinged bars whatever position the said bars may have, as set forth.

2. In a machine for packing the soil beneath its surface, the combination, with the rear bar of the frame A and the wheels F, of the sliding bar T, the scrapers U, attached to the said bar, and the lever W. said sliding bar T being supported movably in bearings at the lower ends of pendent bars of the machine-frame, substantially as herein shown and described, whereby adhering soil can be removed from either side of the wheel-rims, as set forth.

BENJAMIN FRANKLIN WAGGONER.

Witnesses:
GEO. D. FINK,
JNO. W. ROSE.